Aug. 2, 1960
S. E. HARRIS
2,947,157
UNIVERSAL JOINTS
Filed March 26, 1958
2 Sheets-Sheet 1
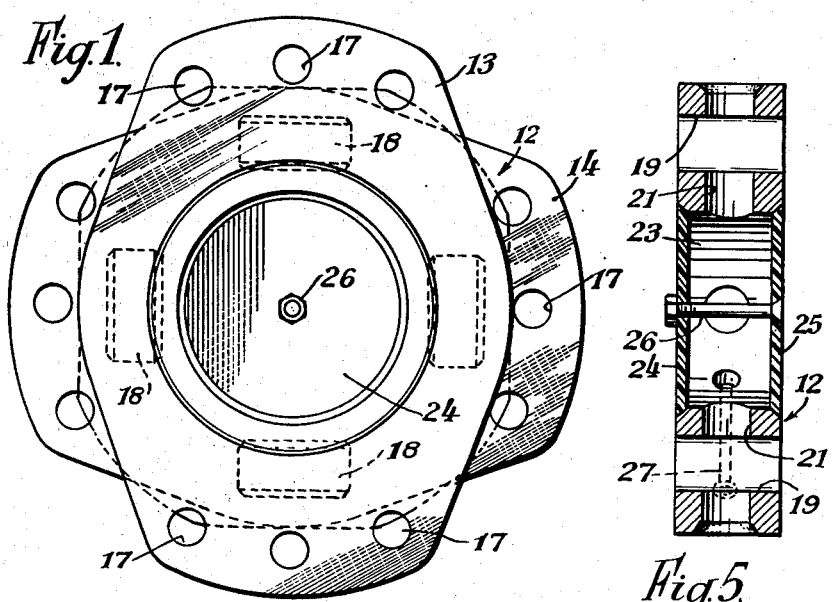
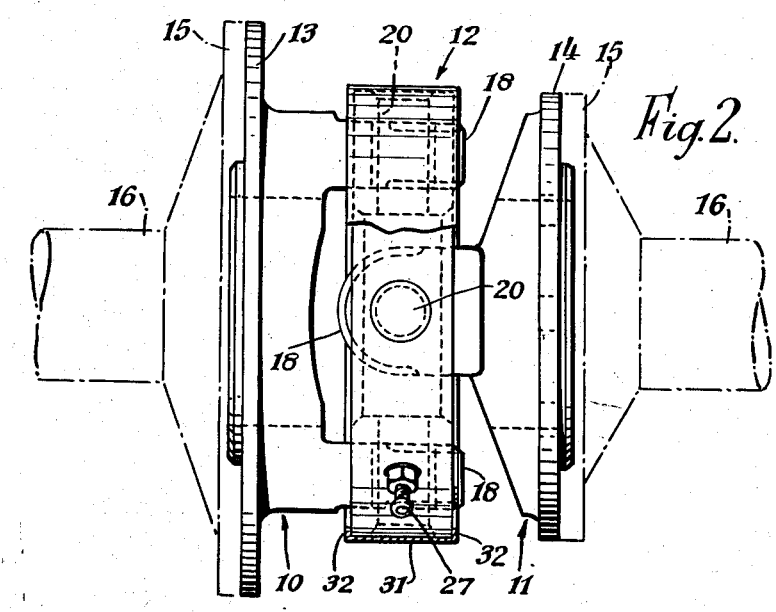
INVENTOR
Stanley Edward HARRIS
BY
Toulmin & Toulmin
ATTORNEYS Aug. 2, 1960     S. E. HARRIS     2,947,157
UNIVERSAL JOINTS
Filed March 26, 1958     2 Sheets-Sheet 2
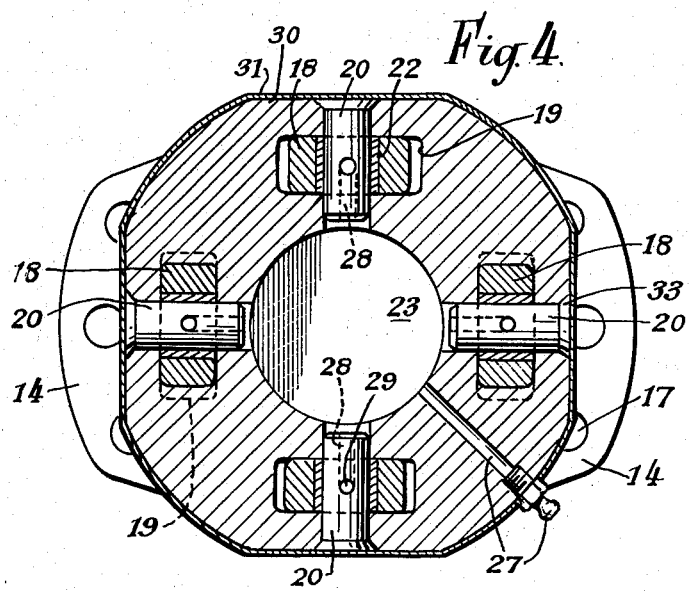
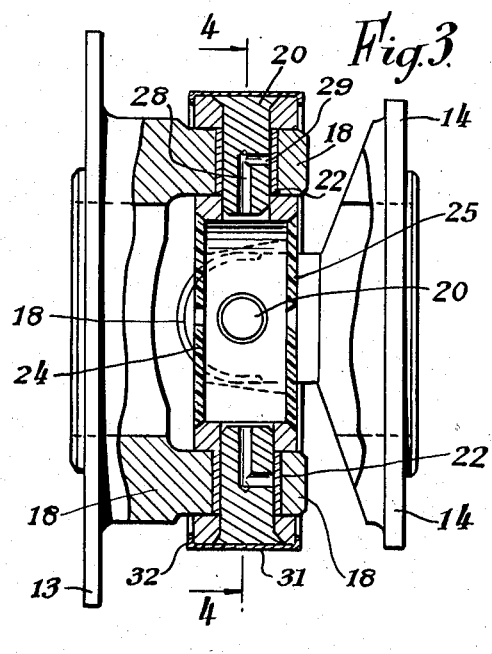
INVENTOR
Stanley Edward HARRIS
BY
Toulmin & Toulmin
ATTORNEYS United States Patent Office 2,947,157
Patented Aug. 2, 1960

2,947,157
UNIVERSAL JOINTS

Stanley Edward Harris, Ewell, England, assignor to The Mollart Engineering Company Limited, Surbiton, England Filed Mar. 26, 1958, Ser. No. 724,099

Claims priority, application Great Britain Aug. 19, 1957

2 Claims. (Cl. 64—18)

This invention relates to universal joints of the kind comprising a pair of terminal elements each formed with a pair of integral jaws or arms extending towards the other terminal element, the jaws or arms of the terminal elements being pivotally connected to an intermediate member located between the terminal elements.

It is an object of the invention to provide an improved construction of such a universal joint. In particular the invention sets out to provide a joint which is simple to manufacture and which is capable of transmitting a high maximum torque for its size. It is a further object to provide a construction having an oil reservoir for ensuring the constant lubrication of the relatively movable parts during the operation of the joint.

According to the present invention there is provided a universal joint comprising a pair of terminal elements each formed with a pair of integral jaws or arms extending towards the other terminal element, and an intermediate member located between the terminal elements and to which the jaws or arms of the terminal elements are pivotally connected, wherein the intermediate member is formed with axially extending slots for receiving the jaws or arms of the terminal elements therein, and the jaws or arms are pivotally retained in the slots by radially located pins or like members.

In the preferred embodiment of the invention the slots in the intermediate member are tapered and the intermediate member is provided with a ring member circumferentially engaging the outer surface of the intermediate member so as to retain the connecting pins or like members radially in position in the intermediate member. Conveniently the intermediate member is formed with a central aperture providing an oil reservoir. The inner end of each of the pins communicates with the oil reservoir and each pin is formed with passageways therein permitting the flow of the oil to the bearing surfaces of the pins during the rotation of the joint.

In order that the invention may be clearly understood a preferred embodiment will now be described by way of example with reference to the accompanying drawings in which:

Figure 1 is an end elevation of the joint incorporating the features of the present invention;

Figure 2 is a side elevation of the joint showing also in broken lines a pair of shafts connected thereby;

Figure 3 is a side elevation similar to Figure 2 but showing the joint partly in section;

Figure 4 is a sectional elevation taken on the line 4—4 of Figure 3; and

Figure 5 is a sectional view of the intermediate member.

The universal joint shown in the drawings comprises mainly a pair of terminal members indicated generally at 10 and 11 respectively and an intermediate member 12. The terminal members 10 and 11 have end flanges 13 and 14 which are adapted to be fastened to flanges 15 of shafts 16 or the equivalent which require to be connected together (see Figure 2), each of said flanges 13 and 14 being provided for this purpose with a circumferential series of apertures 17 adapted to receive fastening bolts (not shown). It will, however, be understood that the terminal elements 10 and 11 may be serrated or splined if desired for connecting the elements to the associated shafts 16.

The terminal elements 10 and 11 are each formed with two spaced axially extending diametrically opposed arms or jaws 18, the arms 18 being adapted to fit within axially extending slots 19 in the intermediate member 12 as will be hereinafter described.

The intermediate member 12 is substantially circular in cross section (see Figure 4) and is provided with four axially extending slots 19 which are spaced about the intermediate member 90° apart. Each of the slots has a constant radial height throughout its depth but its width varies to provide a tapering slot to receive the corresponding arm 18, the larger end of the slot being located for receiving the arm so that when the arm 18 is in position it will be permitted to move freely relatively to the intermediate member 22 (see Figure 3). The provision of the tapered slots 19 allow for easy assembly of the joint and the arms 18 are held in position in the slots 19 by means of pins 20 which are located in radial bores 21 in the intermediate member 12, which bores intersect the slots 19. The securing pins extend radially through apertures in the arms 18, which apertures are provided with suitable bearing surfaces such as the steel-backed bronze bushes 22 as shown, needle rollers or any other suitable form of bearing.

The radial bores 21 extend inwardly of the intermediate member 12 to communicate with a central aperture 23 in the intermediate member. This central aperture is closed to form an oil reservoir by two axial plates 24 and 25 which are held together by connecting means 26 to form a sealed housing. Oil is supplied to the central aperture 23 through a radial passage 27. The oil in the reservoir provided by the aperture 23 is supplied to the bearing surfaces of the pins 20 through passageways formed in the pins and which are shown more clearly in Figure 3 of the drawings. The pins 20 are formed with a first radial passageway 28 which communicates with a second passageway 29 communicating with the bearing surface of the pin. In the operation of the joint the centrifugal force developed throws the oil in the central reservoir outwardly through the passageways 28 and 29 in the pins 20 to provide constant lubrication at the bearing surfaces.

The intermediate member 12 is formed with flattened portions 30 about the radial bores 21 and the pins 20 are retained in position in the bores 21 by a ring member 31 which is located circumferentially around the intermediate member 12 and is formed with radial flanges 32 at its ends to locate it axially thereon. The ring member 31 may be formed in one piece and may be slid axially into position on to the intermediate member after which one of the end flanges 32 may be formed by peening over the end surfaces. If desired the ring member 31 may be formed in the manner of a split ring. The pins 20 may be located against radial movement inwardly of the intermediate member by any suitable means such as the countersunk heads 33.

The universal joint of the present invention provides a greatly improved construction in that it has been found that the joint will transmit more torque for its size than any other known form of joint and it will be appreciated that this is due primarily to the internal mounting of the arms or jaws of the terminal elements within the intermediate member whereby the connecting pins are supported at each side by the intermediate member and are not cantilevered out as in other known joints, If desired, the oil reservoir 23 may be formed by an internal central ring member, the reservoir being provided between the ring member and the inner surface of the intermediate member. Such an arrangement is useful when the joint is required to allow for the internal passage of electrical cables and the like. Furthermore, the intermediate member may be cut away or scalloped between the axially extending slots so as to reduce the size of the ring member.

I claim:

1. A universal joint comprising a pair of terminal members with each of said members having a pair of axially extending arms, said pairs of arms extending toward each other, an intermediate member between said terminal members and having axially extending slots receiving said arms, and radially extending pins passing through each of said arms to pivotally connect said arms to said intermediate member, said intermediate member having centrally located compartment forming a lubricant reservoir, there being passageways in each of said pins and communicating with said reservoir so that the bearing surfaces of said pins can be lubricated during operation of the universal joint.

2. A universal joint comprising a pair of terminal members having flanges thereon, there being means on said flanges for connection to shafts, the distance between said arms being substantially equal to the distance between said connection means, each of said members having a pair of axially extending arms, said pairs of arms extending toward each other, an intermediate member between said terminal members and having axially extending slots receiving said arms, radially extending pins passing through each of said arms to pivotally connect said arms to said intermediate member, a ring positioned around the periphery of said intermediate member and engageable with the outer ends of said pins so as to retain said pins in position, and means on said ring for axially positioning said ring on said intermediate member.

References Cited in the file of this patent

UNITED STATES PATENTS

| | | |
|---|---|---|
| 99,742 | Zwiebel | Feb. 8, 1870 |
| 980,966 | Kinsler | Jan. 10, 1911 |
| 1,899,840 | Williams | Feb. 28, 1933 |
| 2,259,338 | Frank | Oct. 14, 1941 |